US006010064A

United States Patent [19]

Umeda et al.

[11] Patent Number: 6,010,064

[45] Date of Patent: Jan. 4, 2000

[54] COMMODITY DISTRIBUTING LOCKER APPARATUS

[75] Inventors: Yoshiaki Umeda, Tokyo; Takeshi Yoshizawa, Kanagawa, both of Japan

[73] Assignees: Alpha Corp., Kawagawa; Kodak Imagex Ltd.; Direct Marketing Laboratories, Inc., both of Tokyo, all of Japan

[21] Appl. No.: 08/886,411

[22] Filed: Jul. 1, 1997

[30] Foreign Application Priority Data

Jul. 11, 1996 [JP] Japan .................................... 8-182229

[51] Int. Cl.[7] ...................................................... G06F 17/00

[52] U.S. Cl. ............................................ 235/375; 235/381

[58] Field of Search .................................... 235/375, 381, 235/382, 382.5, 383

[56] References Cited

U.S. PATENT DOCUMENTS 4,204,635 5/1980 Hoffmann et al. ...................... 235/382
4,636,634 1/1987 Harper et al. ....................... 250/223 R
4,698,630 10/1987 Ellsberg ................................. 235/382
4,894,717 1/1990 Komei .................................... 348/150
5,223,829 6/1993 Watabe ................................ 235/382.5
5,231,272 7/1993 Mardon .................................. 235/382
5,475,378 12/1995 Kaarsoo et al. ........................ 235/382

FOREIGN PATENT DOCUMENTS 7-49905 2/1995 Japan .

*Primary Examiner*—Donald Hajec
*Assistant Examiner*—Mark Tremblay
*Attorney, Agent, or Firm*—Nikaido Marmelstein Murray & Oram LLP

[57] ABSTRACT

A set of lockers allows a customer to drop off commodities for a service company to pick up. An order is input using an operation screen, and an order sheet which specifies the locker number is issued. A commodity, for example undeveloped film, and the order sheet are put in a transparent request bag and deposited in the locker. When the service company picks up the request bag, the request bag is taken out of the locker, and a bar code on the order sheet is read by a hand scanner. When the order sheet is scanned, the locker it came from is automatically locked, and the next locker which has an undeveloped film order is automatically opened. After processing the film, the developed film and prints are put in a delivery bag, with an attached slip having the locker number to which the bag is to be delivered. Upon delivery to the locker, a first bar code on a slip is read by a hand scanner, and a first locker is unlocked. When a second bar code is scanned, a second locker is automatically unlocked, and the first locker is automatically locked.

9 Claims, 9 Drawing Sheets

COMMODITY DISTRIBUTING LOCKER APPARATUS

BACKGROUND OF THE INVENTION

1. Field of the Invention

The present invention relates to a commodity distributing locker apparatus that handles the exchanging of commodities without talking with distributors and users face-to-face by taking advantage of lockers when, e.g., undeveloped films are picked up or finished prints are delivered in the developing and printing of pictures.

2. Description of the Related Art

A conventional locker apparatus of this type is disclosed, e.g., in Japanese Patent Unexamined Publication No. Hei. 7-49905. This locker apparatus not only allows a user to make an order for the developing and printing of pictures at any hour even when a photo shop or a distributor is closed by allowing the user to deposit an undeveloped film in an automatically operated locker, but also allows the user to receive the developed film and prints from the same locker if the user wishes to develop and print pictures from the undeveloped film.

In order to deposit an undeveloped film, a user inputs an order, a personal identification number (telephone number) and the like. Then, an empty locker is unlocked, so that the user puts the undeveloped film therein. When the user closes the door of the locker, the locker is automatically locked, and a deposit receipt is issued. This is how an order is accepted.

In order to pick up a deposited film, an operator of a photo shop or a distributor turns a key switch on to set the apparatus ready for pickup. When the operator presses a receive button, not only data including the locker number having the film deposited therein and the personal identification number are displayed but also such data is printed out. Thus, the operator opens the door of the locker based on such data and takes out and picks up the film. When the operator thereafter presses an end button, a deposit list is printed out. Then, the operator turns the key switch off to complete the pickup operation.

Further, in order to deliver a developed film and prints to a locker, the operator of a photo shop or a distributor turns the key switch on to set the apparatus ready for delivery. When the operator presses a deposit button, the number of an empty locker is displayed, so that the operator opens the door of such empty locker and puts the developed film and prints in the locker. At this time, the operator inputs the personal identification number corresponding to the delivered locker and the charge for the developed film and prints through a ten-key section. After all commodities have been put in lockers, the operator turns the key switch off to complete the delivery operation.

When a user inputs his or her personal identification number, the charge is displayed, and when the user pays the charge, a receipt is issued and the locker corresponding to the personal identification number is unlocked. Therefore, the user can receive the finished developed film and prints from the unlocked locker.

The aforementioned apparatus addresses the following problems. When the operator picks up a deposited undeveloped film, the operator may, in some cases, mistakenly close the door of a locker with the deposited undeveloped film left in the locker because the operator never doubts about his or her having taken the deposited undeveloped film out of the locker. That is, reliable pickup may not be implemented. Further, when a developed film and prints are to be delivered to a locker, the operator may, in some cases, mistake a locker for a wrong one. That is, reliable delivery may not be implemented. Still further, charges differ from one order to another, and the operator must input a personal identification number and a charge per user on the spot through the ten-key section, which is not only cumbersome but also makes the operation susceptible to error.

The operation of exchanging commodities between users and predetermined persons (shops, distributors, and the like) using lockers in the aforementioned manner can be applied not only to the developing of pictures but also to the laundries in accepting requests and delivering finished commodities. In the latter case also, the same problems arise.

SUMMARY OF THE INVENTION

The present invention has the object to allow commodities to be picked up and delivered reliably in a commodity distributing locker apparatus in which a commodity deposited in a locker by a user is picked up by a distributor and in which the picked up commodity is subjected to predetermined processes and thereafter delivered to the locker again.

To achieve the above object, a commodity distributing locker apparatus has: a plurality of lockers, each for depositing a commodity therein; a control section for controlling the locking and unlocking of the lockers; a recorded sheet on which a specific code corresponding to each of the lockers, the recorded sheet being deposited therein together when the commodity is deposited in one of the lockers; and a code reading device for reading the code on the recorded sheet; wherein in a commodity pickup mode, the control section not only unlocks the locker having the commodity deposited therein, but also locks the unlocked locker by reading the code on the recorded sheet accommodated in the unlocked locker by the code reading device.

Further, in a commodity delivery mode, when the code reading device reads the code on the recorded sheet which is attached to a commodity to be delivered, the control section unlocks the locker corresponding to the read code, and when the code reading device reads a next code, the control section not only unlocks the next locker corresponding to the next read code but also locks the last unlocked locker.

BRIEF DESCRIPTION OF THE DRAWING FIGURES

BRIEF DESCRIPTION OF THE PREFERRED EMBODIMENTS

Figure 1:
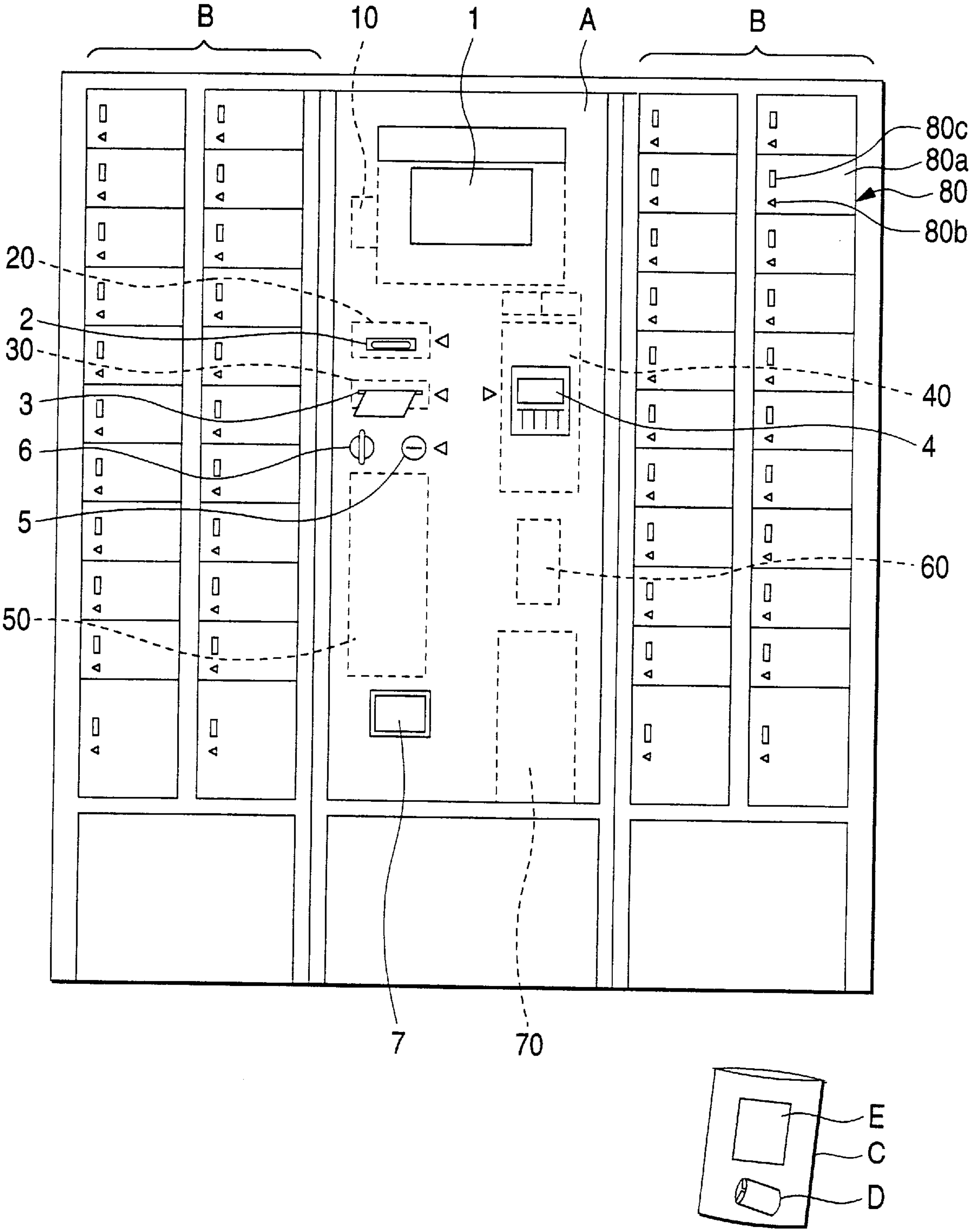
FIG. 1 is a front view showing a commodity distributing locker apparatus, which is an embodiment of the present invention.

A mode of one embodiment of the present invention will now be described with reference to the drawings. The apparatus according to this embodiment is designed to exchange commodities between a user and a photo lab. That is, the user can not only order the developing, printing, and the like of pictures to the photo lab by depositing an undeveloped film and the like but also receive prints and the like from the photo lab through the apparatus. As shown in FIG. 1, the apparatus includes an operation section main body A in the middle and groups of lockers B that flank the operation section main body A. On the front panel of the operation main body A are an operation screen 1, a card issue/insert port 2, a printout discharge port 3, a paper money insert port 4, a coin insert port 5, a coin return lever 6, and a coin return port 7. The operation screen 1 is constructed of a color LCD (liquid crystal display) with a touch panel. The color LCD is incorporated in the operation section main body A.

Further, inside the operation section main body A are a floppy disk drive (FDD) 10 that reads data such as a charge from a floppy disk, a magnetic card reader 20 disposed so as to correspond to the position of the card issue/insert port 2, a printer 30 disposed so as to correspond to the position of the printout discharge port 3, a paper money identifying device 40 disposed so as to correspond to the position of the paper money insert port 4, a coin selecting device 50 disposed so as to correspond to the position in between the coin insert port 5 and the coin return port 7, a handy scanner 60, and a control section 70. It may be noted that the front panel of the operation section main body A can be opened and closed by a not shown master key.

There are a plurality of lockers 80 (20 or 22 on one side in this embodiment) in the groups of lockers B. On the front of a door 80*a* of each locker are a door lamp 80*b* and a handle 80*c*. It may be noted that serial locker numbers are indicated on the respective locker doors 80*a*. When a locker is not used, a transparent request bag C serving as a container is accommodated inside each locker 80. This request bag C is used to deposit an undeveloped film D and an order sheet E in the locker.

How this locker apparatus is used will be described next.

(Develop/Print (D/P) Request)

First, when a user touches the operation screen 1, a mode selecting screen indicating a D/P request mode, a D/P receive mode, and the like is displayed. Then, by operating the operation screen 1, the user not only selects the D/P request mode, but also specifies that he or she is a member customer or a non-member customer. If the user is a member customer, his or her membership card is inserted into the card issue/insert port 2. As a result of this operation, the name, telephone number, and the like of the customer are read from the membership card. On the other hand, if the user is a non-member customer, the user inputs his or her name and telephone number by operating the operation screen 1. The subsequent operation will be managed by these pieces of information. It may be noted that a prepaid card issue mode can be selected under the mode selection operation, a prepaid card being dedicated to this apparatus. The prepaid card can be used to pay a charge at the time of receiving the ordered developed film and prints.

Then, an order is input by operating the operation screen 1. The order is made by selecting appropriate contents from such contents as both developing and printing, only developing, type of additional prints, type of film, print size, number of prints, number of films. When a coin, (for example 1 dollar or 100 yen or the like) is inserted as an advance payment, not only a predetermined locker selected by the locker apparatus is unlocked, but also the door lamp 80*b* of such locker is caused to blink; the order and the like are printed; and an order sheet having information including the locker number printed in the form of a bar code is issued.

Then, the user takes out the transparent request bag C from the unlocked locker, puts the order sheet E and a film D in the request bag C as shown in FIG. 1, puts the bag C back in the locker, and closes the door. Then, when the user operates a confirmation key on the operation screen 1, not only the locker is locked, but also the door lamp 80*b* is caused to keep lit and a deposit receipt is issued. It may be noted that if the user is a member customer, the membership card is returned to the user at this timing. The request has been accepted by the above procedure.

(Pickup)

Figure 9:
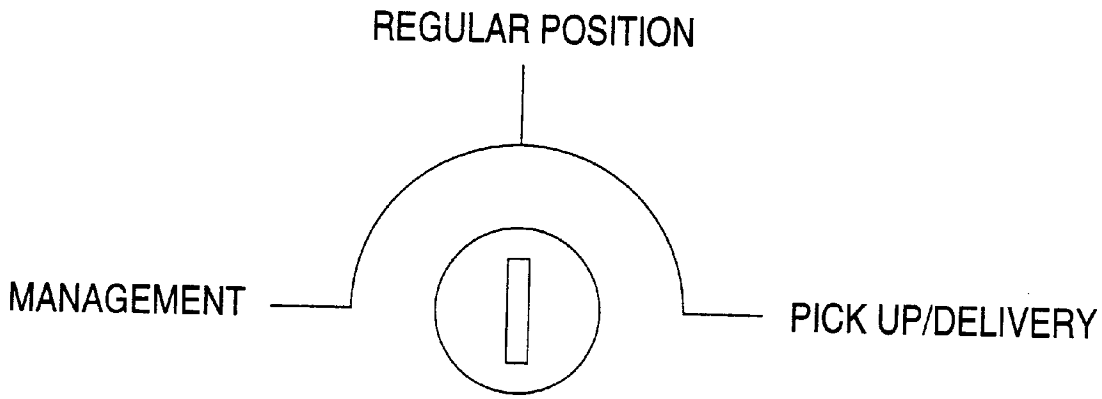
FIG. 9 is a diagram showing positions to be selected by a key operation section in the embodiment shown in FIG. 1.

The pickup operation is made by pickup and delivery operator of a photo lab or the like. First, the operator opens the front panel and sets the apparatus to a “pickup/delivery” mode by setting an internal key section to “pickup/delivery” position. It may be noted that the key operation section is constructed as shown in FIG. 9; i.e., each mode is selected in accordance with the position of the cylinder turned by an operation key. It may be further noted that “regular position” is selected to set the apparatus to the D/P request mode and the D/P receive mode in which a user receives finished commodities, and that “management” is selected to perform such operations as sales calculation and various settings.

After the apparatus has been set to the “pickup/delivery” mode, the operator selects the pickup mode by operating the operation screen 1 and inputs a password (master code). When the password has been accepted, the locker numbers of the lockers accommodating therein the request bags C (each having a film D and an order sheet E) with which D/P orders have been made are displayed on the operation screen 1. A locker whose locker number is the smallest is unlocked and the door lamp 80*b* of such unlocked locker is caused to blink. It may be noted that the locker number of such unlocked locker is reversely displayed on the operation screen 1.

Then, the operator takes the request bag C out by opening the door of the unlocked locker and reads the bar code of the order sheet E put in the request bag C together with the film D with the handy scanner 60. As a result of this reading operation, not only the locker is locked but also a locker having the next smallest locker number is unlocked. The operator repeats the aforementioned pickup operation for all the locker numbers displayed on the operation screen 1, and when the pickup operation has been completed, a pickup list is printed out. All the lockers whose request bags have been picked up are closed and the door lamps 80*b* thereof are caused to keep lit. As a result, the currently picked up lockers wait for delivery and can no longer accept new D/P requests. When the aforementioned pickup operation has been through, the operator resets the operation key to the regular position and closes the front panel.

(Delivery)

Finished commodities such as a developed film and prints are put in a transparent delivery bag similar to the request bag C, and a slip having a recording of the locker number of a locker to which the finished commodities are to be delivered (the locker to be delivered) in the form of a bar code is attached to the delivery bag. Further, a floppy disk in which the D/P charges of finished commodities are recorded in accordance with the order sheets is prepared by a photo lab, a management center, and the- like. An operator delivers finished commodities put in the delivery bags, bringing the floppy disk with him.

The operator opens the front panel and sets the apparatus to the pickup/delivery mode by operating the key. Then, the operator selects the delivery mode by operating the operation screen 1 and inputs the password. Successively, the floppy disk having a recording of the D/P charges is set to the floppy disk drive 10, and makes a confirmation on the operation screen 1. As a result of this operation, the charges to be paid at the time the users receive the commodities from the lockers are set. With the charges having been set, the locker numbers of the lockers to be delivered and the set charges are displayed on the operation screen 1. When the operator reads a bar code on the slip of a delivery bag with the handy scanner 60, not only the corresponding locker is unlocked but also the door lamp 80*b* thereof is caused to blink. At the same time, a notation “delivery” is displayed beside the locker number and the charge displayed on the operation screen 1.

Through similar operations for the second time and onwards, the operator sequentially puts delivery bags in the corresponding unlocked lockers while reading the bar codes on the slips of these delivery bags with the handy scanner 60. In the delivery operations for the second time and onwards, not only the last locker for which the delivery operation has been completed is locked but also the door lamp 80*b* of such locker is caused to light every time a bar code is read, and the locker becomes ready to be received. When the delivery operation has been completed by putting all the delivery bags in the lockers, a delivery list is printed out.

In the case where a wrong delivery bag is put in an unlocked locker, then such unlocked locker having the wrong delivery bag put therein is unlocked again when the bar code of a correct delivery bag has been read. When such locker has been unlocked again, the operator finds that the wrong delivery bag is in the locker, finding his or her mistake. Therefore, if the operator performs the delivery operation again, reliable delivery can be implemented. When the aforementioned delivery operation has been completed, the operator resets the operation key to the normal position and closes the front panel.

(D/P Receive)

When the user touches the operation screen 1, the mode selection screen indicating the D/P request mode, the D/P receive mode, and the like is displayed. By operating the operation screen 1, the user selects the receive mode and inputs the request number printed on the deposit receipt. If the user does not have a deposit receipt, the user inserts his or her membership card, telephone number, or the like. As a result of this operation, the name of the user and a message indicating that the ordered commodities are ready are displayed. If the ordered commodities are not yet ready (not delivered), then a message to such effect is displayed.

When the ordered commodities have been ready, the user makes a confirmation on the operation screen 1. Then, the charge (amount of money to be paid minus the advance payment) is displayed. Therefore, the user inserts money amounting to the charge. When the user inserts money that is more than required, the locker accommodating therein the finished commodities is unlocked and the door lamp 80*b* of such locker is caused to blink. Payment of the charge may be made also by a prepaid card. Further, if a receipt is necessary, a receipt button is pressed on the operation screen 1. When the user opens the door of the locker, takes the finished commodities out, and closes the door, the locker is locked and the door lamp 80*b* is turned off several seconds later. At the same time, the change is returned; the receipt is issued; or the prepaid card is discharged.

Figure 2:
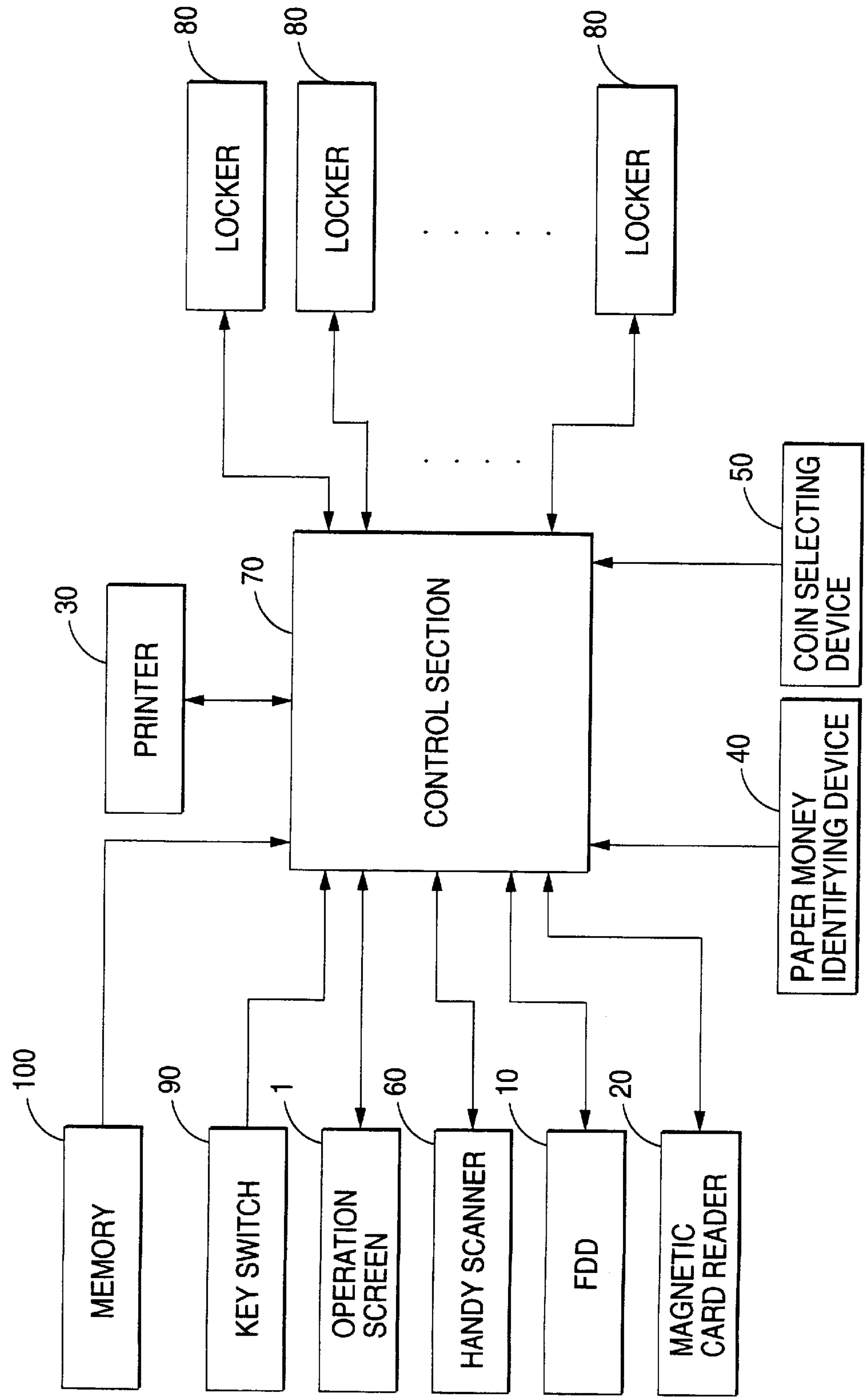
FIG. 2 is a block diagram showing the commodity distributing locker apparatus shown in FIG. 1.

As shown in FIG. 2, the operation screen 1 (touch panel and color LCD), the floppy disk drive 10, the magnetic card reader 20, the printer 30, the paper money identifying device 40, the coin selector 50, the handy scanner 60, the lockers 80, a key switch 90 for detecting the positions of the operation key and a memory 100 are connected to the control section 70. The control section 70 is constructed of a microcomputer or the like, and controls various parts of the apparatus in accordance with control flows to be described below in order to perform the operations in the respective modes.

It may be noted that input and display control of the operation screen 1, and control of the floppy disk drive 10, the magnetic card reader 20, the printer 30, and the handy scanner 60 are similar to control effected by conventional electronic devices. Further, inserted charge judging control and the like effected by the paper money identifying device 40 and the coin selecting device 50 are similar to control and the like effected by vending machines and the like. Still further, locking and unlocking control of the lockers 80, lighting control of the door lamps 80*b*, and the like are also similar to control effected by coin-operated lockers. Therefore, detailed descriptions of these controls will be omitted.

Figure 3:
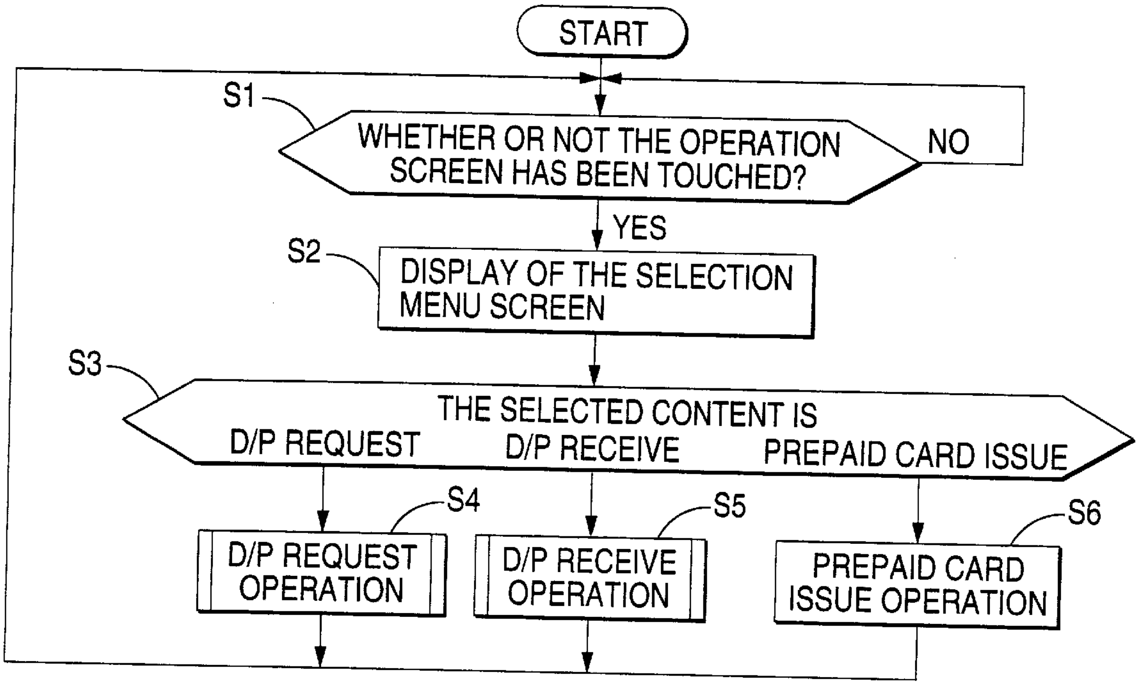
FIG. 3 is a flowchart showing request/receive selection mode operation in the embodiment shown in FIG. 1.

FIG. 3 is a flowchart showing a request/receive selection mode operation that is started when the operation key is set to the normal position. First, whether or not the operation screen 1 has been touched is checked in Step S1. If the operation screen 1 has been touched, a selection menu screen is displayed in Step S2. Displayed in the selection menu screen are selection buttons for “D/P request”, “D/P receive”, and “prepaid card issue”. Then, the selected content is determined in Step S3, and Steps S4 and S5 or S6 are performed in accordance with the selected contents.

Figure 4:
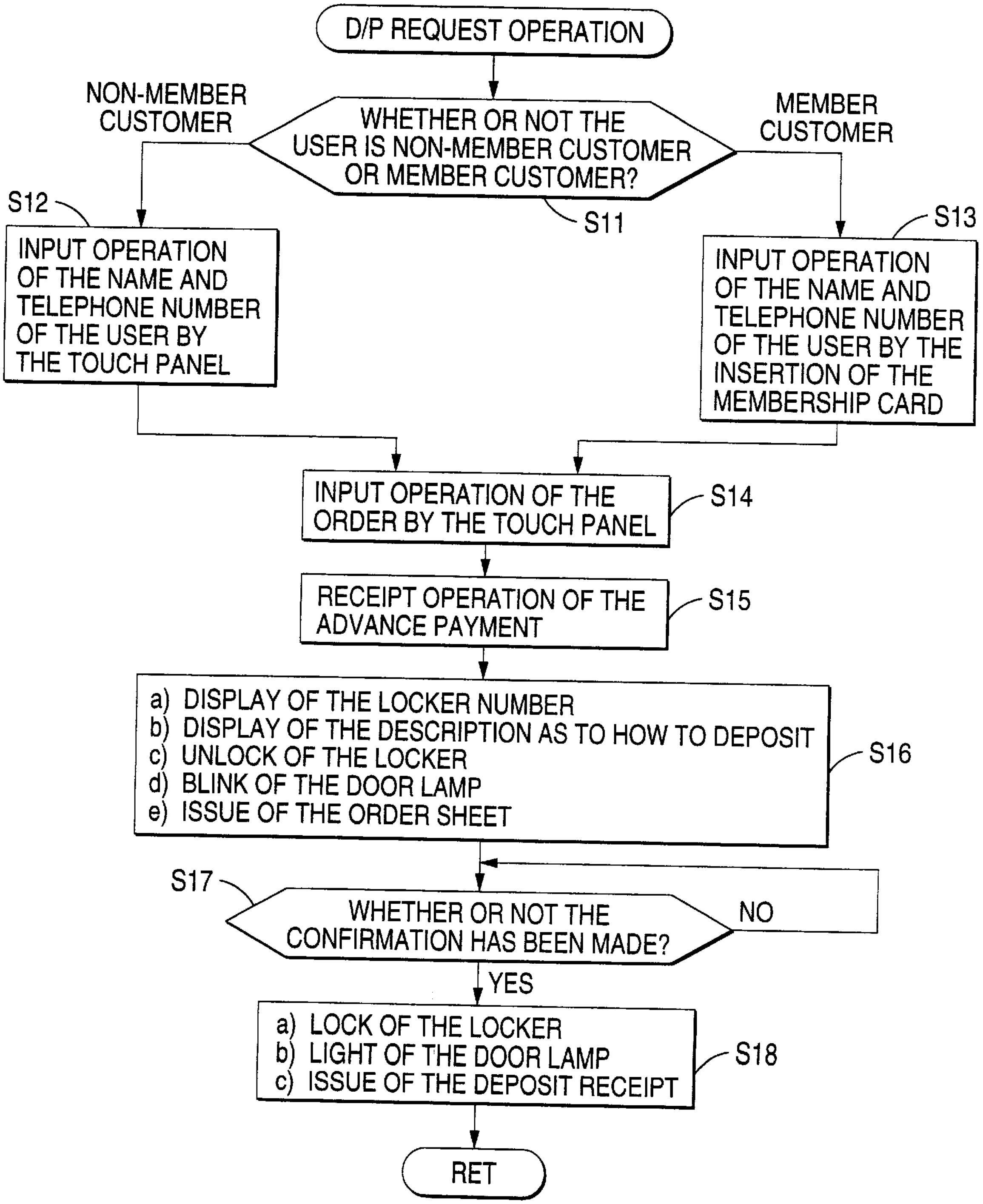
FIG. 4 is a flowchart showing a D/P request operation in the embodiment shown in FIG. 1.
Figure 5:
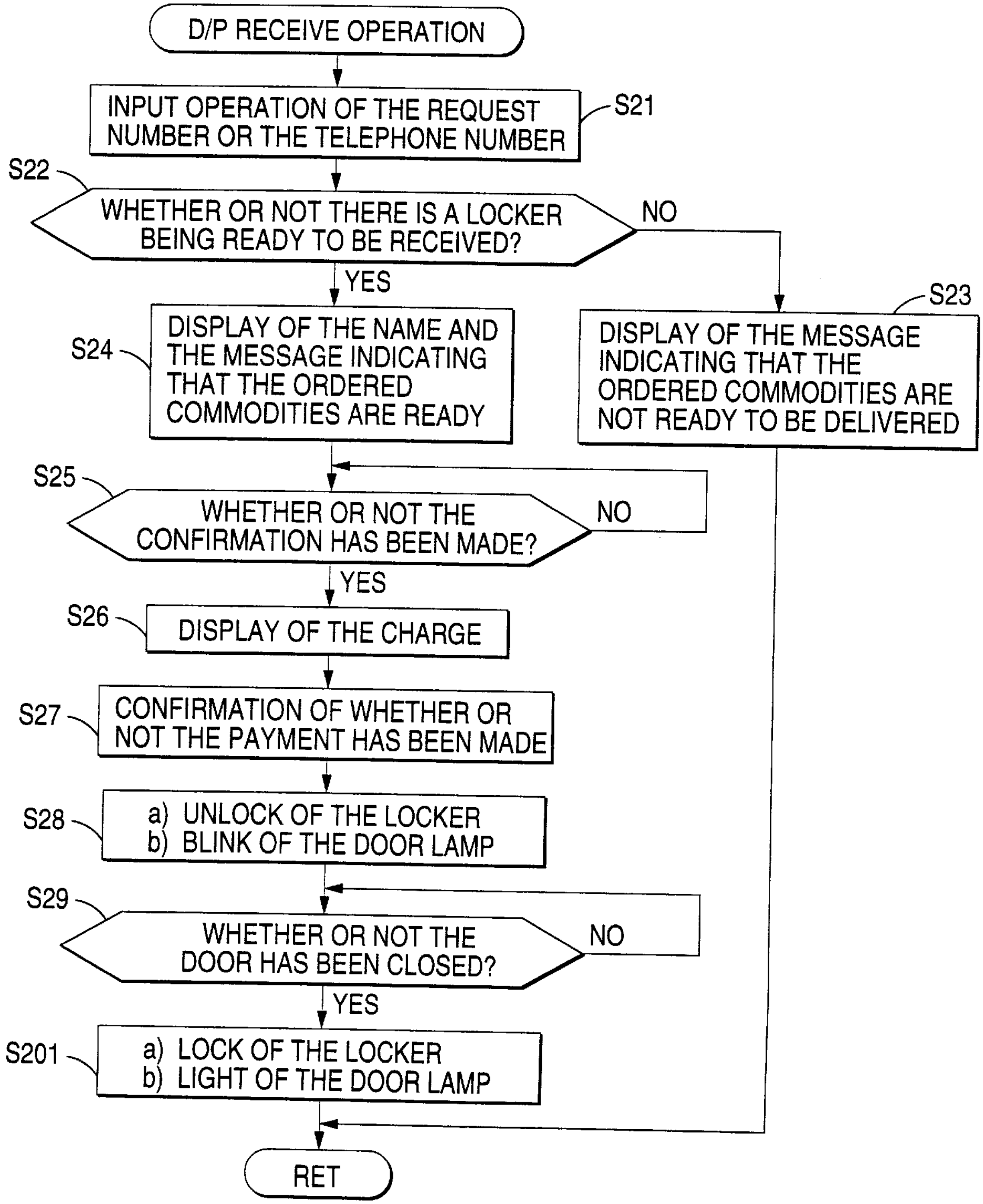
FIG. 5 is a flowchart showing a D/P receive operation in the embodiment shown in FIG. 1.

In Step S4, the D/P request operation shown in FIG. 4 is performed. In Step S5, the D/P receive operation shown in FIG. 5 is performed. In Step S6, the prepaid card issue operation for issuing a prepaid card used in this locker apparatus is performed. Step S1 will be performed after these operations. It may be noted that a prepaid card is issued by an operation similar to the conventional operation.

The D/P request operation shown in FIG. 4 is performed in the following manner. First, whether or not a user is a non-member customer or a member customer is determined based on the operation of the operation screen 1 in Step S11. If the user is determined to be a non-member customer, the name and telephone number of the user are input based on the display and operation of the operation screen 1 in Step S12, and then Step S14 will be performed. If, on the other hand, the user is determined to be a member customer, the name and telephone number of the user are input by inserting his or her membership card in Step S13, and then Step S14 will be performed. Successively, an order is input by operating the operation screen 1 in Step S14, and an advance payment is made in Step S15.

When the advance payment has been made, the locker number and a description as to how a film and the like are deposited are displayed; a locker is unlocked and the door lamp of the unlocked locker is caused to blink; and an order sheet having the locker number of the unlocked locker printed in the form of a bar code is issued in Step S16. In Step S17, whether or not a confirmation has been made through the operation screen 1 is checked. If the confirmation has been made, the locker is locked and the door lamp is caused to light; and a deposit receipt is issued. After these operations, the control section 70 returns to the original routine.

The D/P receive operation shown in FIG. 5 is performed in the following manner. First, in Step S21, the request number, telephone number, or the like are input based on the operation screen 1 operation or membership card inserting operation. Then, in Step S22, whether or not there is a locker not only corresponding to the input request number or telephone number but also being ready to be received is checked. It there is no such locker, a message indicating that the ordered commodities are not ready to be delivered is displayed in Step S23. The control section 70 thereafter performs a predetermined operation and returns to the original routine. If there is a corresponding locker ready to be received, the name of a user and a message indicating that the commodities are ready are displayed in Step S24. Step S25 will thereafter be performed.

In Step S25, whether or not a confirmation has been made through the operation screen 1 is checked. If the confirmation has been made, a charge is displayed in Step S26 and whether or not payment has been made by inserting money or through a prepaid card is checked in Step S27. When the payment has been made, the corresponding locker is unlocked and the door lamp is caused to blink in Step S28. The control section 70 waits under this condition until the door is closed in Step S29. When the door has been closed, the corresponding locker is locked and the door lamp is turned off several seconds later in Step S201. The control section 70 thereafter returns to the original routine.

Figure 6:
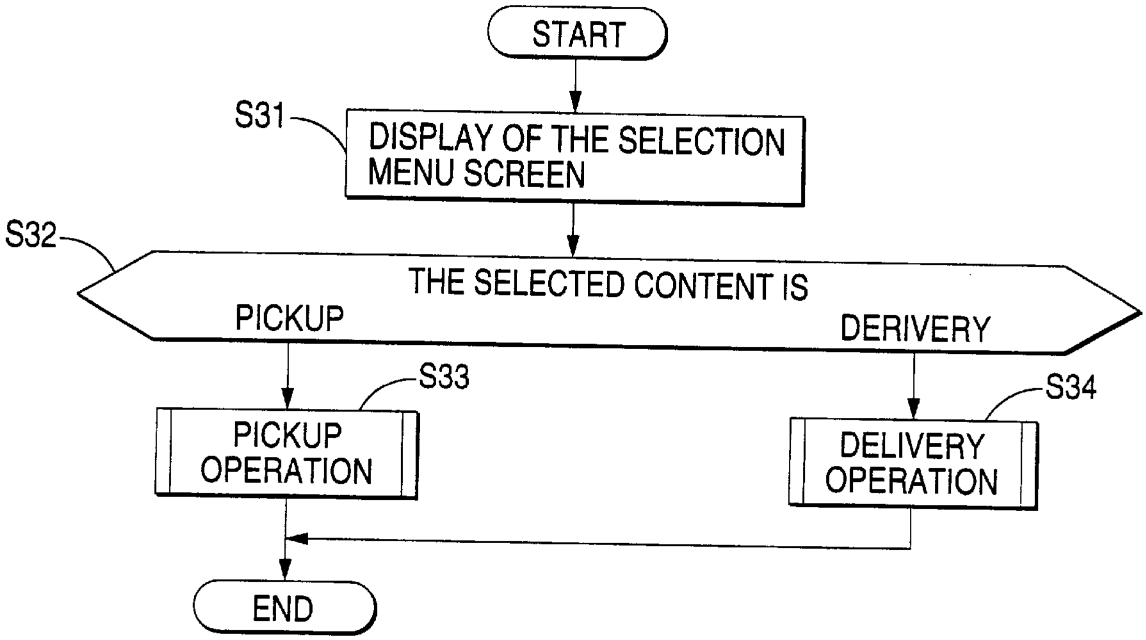
FIG. 6 is a flowchart showing a pickup/delivery selection operation in the embodiment shown in FIG. 1.
Figure 7:
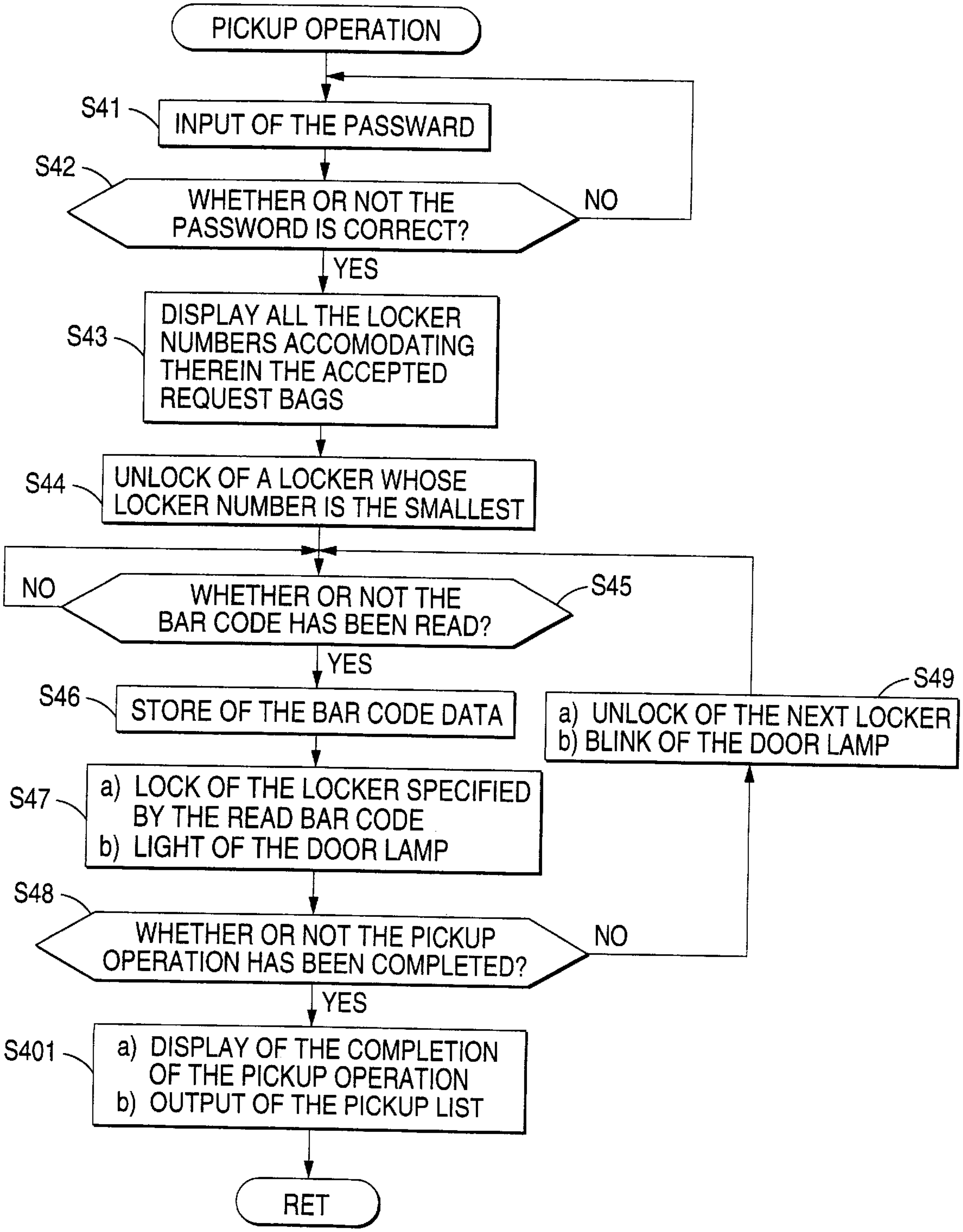
FIG. 7 is a flowchart showing a pickup operation in the embodiment shown in FIG. 1.
Figure 8:
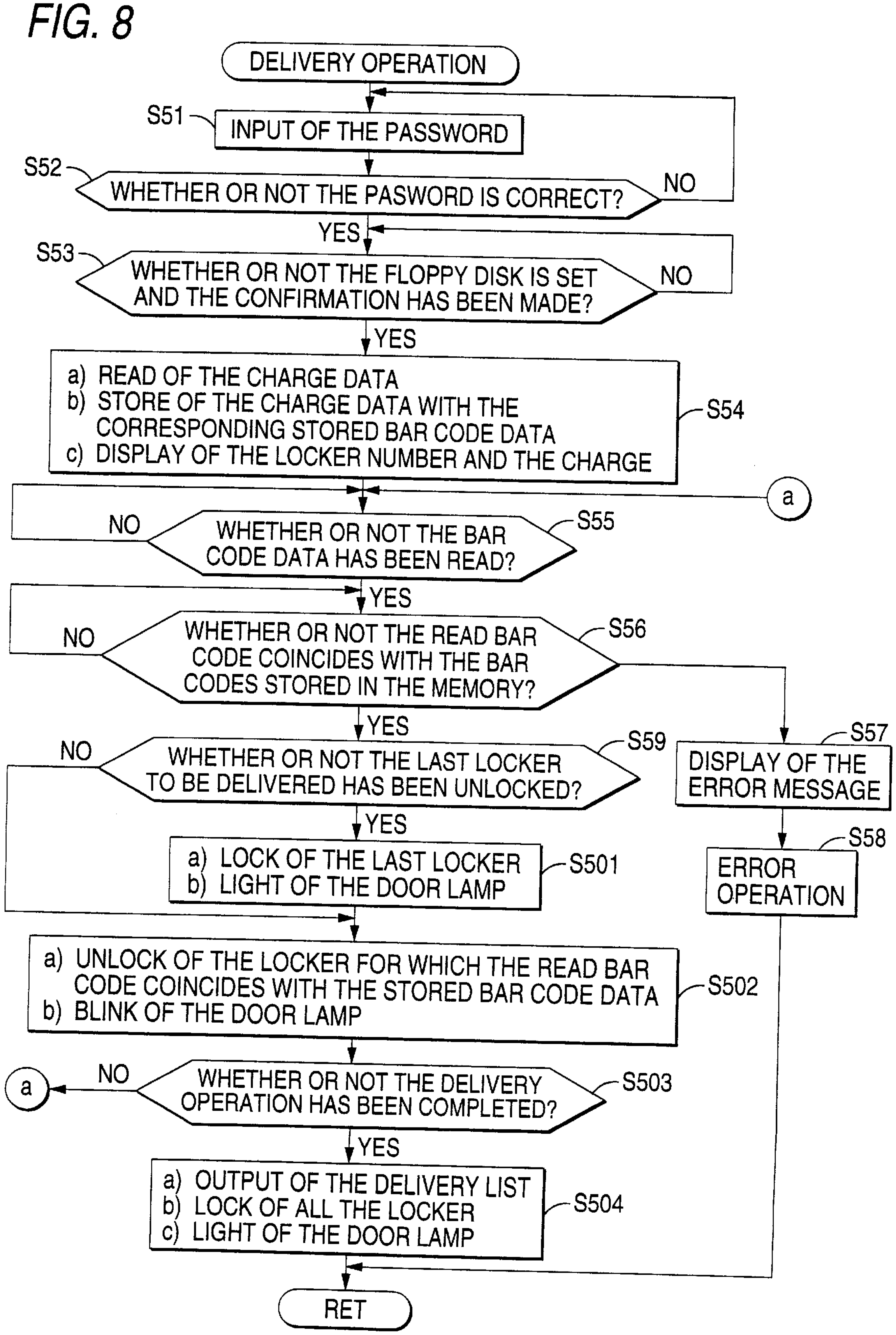
FIG. 8 is a flowchart showing a delivery operation in the embodiment shown in FIG. 1.

The flow shown in FIG. 6 presents an operation to be started when the pickup/delivery selection mode has been set. First, the selection menu screen is displayed in Step S31. A "pickup" button and a "delivery" button are displayed on the selection menu screen at this timing. Then, the selected content is determined in Step S32, and the pickup operation shown in FIG. 7 is performed in Step S33 based on the selected contents. Then, in Step S34, the delivery operation shown in FIG. 8 is performed. The whole operation is thus completed.

The pickup operation shown in FIG. 7 is performed in the following manner. First, a password is input in Step S41, and whether or not the password is correct is checked in Step S42. If the password is not correct, Step S41 will be performed again. If the password is correct, then all the lockers accommodating therein the accepted request bags are displayed on the operation screen 1 in Step S43, and not only a locker whose locker number is the smallest is unlocked, but also the door lamp of such locker is caused to blink in Step S44. Step S45 will thereafter be performed. Since the pickup operation is selected by operating the operation key, the password input operation may be skipped.

In Step S45, whether or not a bar code has been read by the handy scanner 60 is checked. If a bar code has been read, the read bar code data is stored in Step S46, and not only the locker specified by the read bar code (the locker containing the request bag to which the read bar code belongs) is locked but also the door lamp of such locker is caused to light in Step S47. Then, whether or not the pickup operation has been performed for all the lockers that have accepted the requests is determined in Step S48. If not, a next locker is unlocked and the door lamp of such locker is caused to blink in Step S49, and Step S45 will then be performed again. If, on the other hand, the pickup operation has been completed for all the lockers, not only a pickup end message is displayed but also a pickup list is output in Step S401. The control section 70 thereafter returns to the original routine.

As a result of the aforementioned pickup operation, the lockers having the accepted request bags deposited therein are unlocked by the control section. When the bar code of the order sheet contained in each request bag that has been taken out of the corresponding locker is read, such locker is automatically locked. Therefore, while the request bag is out of the locker, that locker is kept locked, which in turn prevents the operator from erroneously leaving the request bag in the locker. Hence, reliable pickup operation can be implemented.

The delivery operation shown in FIG. 8 is performed in the following manner. First, the password is input in Step S51. Then, whether or not the password is correct is checked in Step S52. If the password is not correct, Step S51 will be performed again. If the password is correct, not only whether or not the floppy disk is set to the floppy disk drive 20, but also whether or not a confirmation has been made is checked on the operation screen 1 in Step S53. When the confirmation has been made, then, in Step S54, the charge data of each locker is read from the floppy disk; the read charge is stored in the memory 100 together with the corresponding stored bar code data; and the locker number of a locker to be delivered and the set charge are displayed on the operation screen 1. Step S55 will thereafter be performed.

Then, whether or not a bar code has been read with the handy scanner 60 is checked in Step S55. If a bar code has been read, whether or not the read bar code coincides with the bar codes stored in the memory is checked in Step S56. If there is a stored bar code that coincides with the read bar code, then Step S59 will be performed. If not, an error message is displayed in Step S57, and an error operation is performed in Step S58. The control section 70 thereafter returns to the original routine. It may be noted that in this error operation, operations such as the operation of checking the locker number of a locker to be delivered and the operation of unlocking the locker are performed and a re-delivery confirming operation is thereafter performed.

If the read bar code coincides with a stored bar code, whether or not a last locker to be delivered has been unlocked is checked in Step S59. If not, Step S502 will be performed directly (at the first bar code-reading operation). If a last locker has been unlocked (at the second bar code reading operation and onwards), not only the last locker is locked but also the door lamp is caused to light in Step S501, and then Step S502 will be performed. As a result of this operation, the last delivered locker is locked at the second delivery operation and onwards.

In Step S502, the locker for which the read bar code coincides with the stored bar code data is unlocked and the door lamp is caused to blink, and in Step S503, whether or not the delivery operation has been completed for all the lockers to be delivered. If not, Step S55 will be performed again. On the other hand, if the delivery operation has been completed for all the lockers, a delivery list is output, and all the lockers are locked and the door lamps are caused to light in Step S504. Then, the control section 70 returns to the original routine.

As a result of the aforementioned operation, not only the last locker is locked every time the bar code of a delivery bag is read, but also the locker corresponding to the read bar code is always unlocked. Therefore, even if a delivery bag is erroneously put in a wrong locker, the operator can notice his or her error during the operation, which in turn allows reliable delivery to be implemented.

Further, since the charge data and the like are input through the floppy disk, the operation is not cumbersome and input errors can be prevented. In addition, the number of the commodities to be delivered can be confirmed by the input through the floppy disk.

In the above embodiment, the locker picked up of the request bag can not be used by the user, until the operator of a photo shop or a distributor delivers the finished commodities. However, in the delivery mode, the commodities to be delivered may be put in an empty locker, when the memory stores a bar code date read by the handy scanner and a data input from the floppy disk corresponding to the empty locker delivered with the finished commodities. Therefore, in the D/P receive mode, when the user inputs the request number, the locker corresponding to the request number is unlocked so that the user can receive the finished commodities. Accordingly, the user can utilize the remained lockers, except for the lockers with the commodities to be picked up or the finished commodities.

As described above, the reason why commodities are picked up and delivered through a locker apparatus is to allow a user to request the developing and printing of pictures and to receive finished commodities without being restricted by the office hours of a photo shop, a distributor, and the like. Therefore, how a locker apparatus is utilized, i.e., where a locker apparatus is located, where a distributor does its business, and the like, depends on the business environment. That is, while all the operations including request, pickup, delivery, and receipt of commodities are performed through a locker apparatus in the aforementioned embodiment, how a locker apparatus is utilized is not limited to this example.

For example, a distributor and a locker apparatus may be located within the station precincts or close to a station; requests from users may be accepted by the distributor, e.g., during rush hours; and the users can receive finished commodities from the locker apparatus after the shop of the distributor is closed. In this case, the pickup operation may not be performed by the locker apparatus. On the other hand, requests may be accepted by the locker apparatus and finished commodities may be received from the distributor. In this case, the delivery operation may not be performed by the locker apparatus.

Further, while a locker apparatus that picks up and delivers films and prints for the developing and printing of pictures has been described in the aforementioned embodiment, the present invention may also be applied to a locker apparatus for picking up and delivering clothes or the like in, e.g., laundries. In such a case also, reliable pickup and delivery can be implemented by performing similar operations.

As described in the foregoing description, according to the commodity distributing locker apparatus, an article is deposited in a locker with the commodity contained in a container and with a recorded sheet attached to the container, the recorded sheet having a code such as a bar code recorded thereon; and in a commodity pickup mode, a locker having the commodity deposited therein is unlocked, and the unlocked locker is locked by reading the code on the recorded sheet attached to the container for the commodity that has been taken out of the locker using a code reading device such as a handy scanner. Therefore, the locker is never locked with a commodity deposited therein, which in turn allows commodities to be picked up reliably.

Further, in a delivery mode, a commodity is delivered to a locker with the commodity contained in a container and with a recorded sheet attached to the container, the recorded sheet having a code such as a bar code recorded thereon; and by reading a code on the recorded sheet attached to the container using a code reading device such as a handy scanner, a locker corresponding to the read code is unlocked, so that a commodity is delivered to that locker; and by reading the code of another commodity, not only a locker corresponding to the read code is unlocked, but also the last unlocked locker is locked. Therefore, even if a wrong commodity is erroneously delivered to an unlocked locker, the operator can notice his or her error when the code of a commodity that must be put in such unlocked locker has been read because the operator finds that the wrong commodity has already been put in such unlocked locker. As a result, reliable delivery can be implemented.

It may be noted that if a recording medium such as a floppy disk is used to input the charge data and like of commodities to be delivered in the delivery mode as in the commodity distributing locker apparatus, less cumbersome and more reliable operation can be implemented. In addition, in the delivered mode, the number of commodities to be delivered can be found by the input from the recording medium, thereby being delivered with more reliability.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

What is claimed is:

1. A commodity distributing locker apparatus comprising:

a plurality of lockers, each for depositing a commodity therein;

a control means for controlling the locking and unlocking of the lockers;

a recorded sheet on which is recorded a specific code corresponding to each of the lockers, the recorded sheet being deposited together with the commodity in one of the lockers; and a code reading means for reading the code on the recorded sheet; wherein in a commodity pickup mode, the control means for unlocking the locker having the commodity deposited therein, and for locking the unlocked locker by reading the code on the recorded sheet which was accommodated in the unlocked locker by the code reading means.

2. A commodity distributing locker apparatus according to claim 1, further comprising:

a plurality of containers, each for containing the commodity therein and attaching the recorded sheet thereto when the commodity is deposited in one of the lockers.

3. A commodity distributing locker apparatus according to claim 1, wherein the code is a bar code; and the code reading means is a scanner.

4. A commodity distributing locker apparatus according to claim 1, wherein, in the commodity pickup mode, when one of the of lockers is unlocked, the other thereof is locked.

5. A commodity distributing locker apparatus comprising:

a plurality of lockers, each for depositing commodities therein;

a control means for controlling the locking and unlocking of the lockers;

a recorded sheet on which is recorded a specific code corresponding to each of the lockers, the recorded sheet being attached to the commodity when the commodity is delivered to one of the lockers; and a code reading means for reading the code on the recorded sheet; wherein in a commodity delivery mode, when the code reading means reads the code on the recorded sheet attached to the commodity to be delivered, the control means for unlocking the locker corresponding to the read code, and when the code reading means reads the next code, the control means for unlocking the next locker corresponding to the next read code and for locking the last unlocked locker.

6. A commodity distributing locker apparatus according to claim 5, further comprising;

a plurality of containers, each for containing the commodity therein and attaching the recorded sheet thereto when the commodity is delivered to one of the lockers.

7. A commodity distributing locker apparatus according to claim 5, wherein the code is a bar code; and the code reading means is a handy scanner.

8. A commodity distributing locker apparatus according to claim 5, further comprising:

a data reading device for reading a data about commodities to be delivered from a recording medium having the data.

9. A commodity distributing locker apparatus according to claim 5, wherein, in the commodity delivery mode, when one of the pularity of lockers is unlocked, the other thereof is locked.

* * * * *